United States Patent
Soliman et al.

(10) Patent No.: US 7,678,013 B2
(45) Date of Patent: Mar. 16, 2010

(54) LAUNCH CONTROL OF A HYBRID ELECTRIC VEHICLE

(75) Inventors: Ihab S. Soliman, Warren, MI (US);
Deepak Aswani, Westland, MI (US);
Andrew J. Silveri, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 461 days.

(21) Appl. No.: 11/891,135

(22) Filed: Aug. 9, 2007

(65) Prior Publication Data

US 2009/0042689 A1  Feb. 12, 2009

(51) Int. Cl.
*B60W 10/08* (2006.01)
*B60W 10/04* (2006.01)
*B60W 10/00* (2006.01)

(52) U.S. Cl. .................. 477/5; 477/111; 180/65.265

(58) Field of Classification Search ............ 477/3, 477/5, 6, 110, 111, 180; 74/335, 340; 180/65.265, 180/65.285, 65.28
See application file for complete search history.

(56) References Cited

U.S. PATENT DOCUMENTS 6,574,535 B1  6/2003  Morris et al.
7,628,728 B2 * 12/2009 Soliman et al. ............... 477/5
2005/0181907 A1  8/2005  Colvin et al.
2006/0135317 A1 * 6/2006  Jacobs .................... 477/180
2006/0266569 A1 11/2006  Fujiwara et al.
2008/0058154 A1 * 3/2008  Ashizawa et al. ............ 477/5
2008/0305925 A1 * 12/2008 Soliman et al. ............... 477/5

* cited by examiner

*Primary Examiner*—Roger Pang
(74) *Attorney, Agent, or Firm*—David B. Kelley; MacMillan, Sobanski & Todd, LLC

(57) ABSTRACT

A method for controlling the launch of a vehicle having a powertrain that includes a first power path for driving a first wheel set and including an engine, a transmission having an input driveably connected to a crankshaft of the engine, a current gear, an input clutch associated with the current gear and an output connected to first wheel set, and a second power path including an electric machine for driving a second wheel set. The method includes determining a desired magnitude of wheel torque to be produced at the first wheel set, using the desired magnitude of wheel torque to be produced at the first wheel set to determine a magnitude of crankshaft torque, producing a predetermined magnitude of torque capacity at the input clutch, determining a crankshaft speed error, determining a change in magnitude of torque at the crankshaft that will reduce the crankshaft speed error, and operating the engine to produce a desired engine torque, whose magnitude is determined from the change in magnitude of torque at the crankshaft and the magnitude of desired crankshaft torque.

25 Claims, 7 Drawing Sheets

LAUNCH CONTROL OF A HYBRID ELECTRIC VEHICLE

BACKGROUND OF THE INVENTION

1. Field of the Invention

This invention relates generally to a powertrain for a hybrid electric vehicle having an engine and one or more electric machines and, in particular, to controlling torque transmitted to the drive wheels when the vehicle is being accelerated from a stopped or nearly stopped condition, called vehicle launch.

2. Description of the Prior Art

A powershift transmission is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

During a vehicle launch condition in a conventional vehicle whose powertrain includes a powershift transmission, the engine and transmission are concurrently controlled in a coordinated manner to provide acceptable vehicle launch performance. In a powershift transmission vehicle application, providing consistent and acceptable vehicle launch performance can be a rather difficult control problem due to the lack of a torque converter. During a vehicle launch condition in this type of vehicle application, the torque capacity of the transmission clutch and slip across the clutch are carefully controlled in coordination with the engine torque to provide the desired vehicle response. Problems which can occur during these events include engine stall, excessive clutch slip, reduced clutch durability, dead pedal feel, and inconsistent response are a few examples.

A powershift transmission may be used in a hybrid electric vehicle (HEV), in which one or more electric machines, such as a motor or an integrated starter-generator (ISG), are arranged in series and parallel with the engine. Unlike a conventional vehicle with a powershift transmission, in a hybrid electric vehicle with a powershift transmission, there are multiple propulsion paths and multiple power sources, the engine and electric machines, which can be used during a vehicle launch condition. Therefore, a more sophisticated powershift vehicle launch control system is needed to deal with the complexities and added powertrain operating modes of an HEV in response to a vehicle launch request from the vehicle operator.

SUMMARY OF THE INVENTION

The system and method for controlling vehicle launch in a HEV takes advantage of additional propulsion paths and torque actuators to improve vehicle launch performance and to overcome problems and deficiencies presented by a conventional vehicle with a powershift transmission.

This control strategy supports torque blending when multiple propulsion paths are used for propulsion during vehicle launch due to enhanced powershift transmission control. Moreover, the control coordinates clutch torque capacity control when propulsion assistance is provided by the additional torque actuators, which improves clutch durability since clutch load is reduced accordingly. The control supports multiple HEV powertrain operating modes and transitions, automatically operates the same as a conventional vehicle with a powershift if the additional torque actuators are not used, and is applicable to any HEV powertrain architecture that employs a powershift transmission whether the input clutches are wet or dry clutches.

A method for controlling the launch of a vehicle applies to a powertrain that includes a first power path for driving a first wheel set and including an engine, a transmission having an input driveably connected to a crankshaft of the engine, a current gear, an input clutch associated with the current gear and an output connected to first wheel set, and a second power path including an electric machine for driving a second wheel set. The method includes determining a desired magnitude of wheel torque to be produced at the first wheel set, using the desired magnitude of wheel torque to be produced at the first wheel set to determine a magnitude of crankshaft torque, producing a predetermined magnitude of torque capacity at the input clutch, determining a crankshaft speed error, determining a change in magnitude of torque at the crankshaft that will reduce the crankshaft speed error, and operating the engine to produce a desired engine torque, whose magnitude is determined from the change in magnitude of torque at the crankshaft and the magnitude of desired crankshaft torque.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
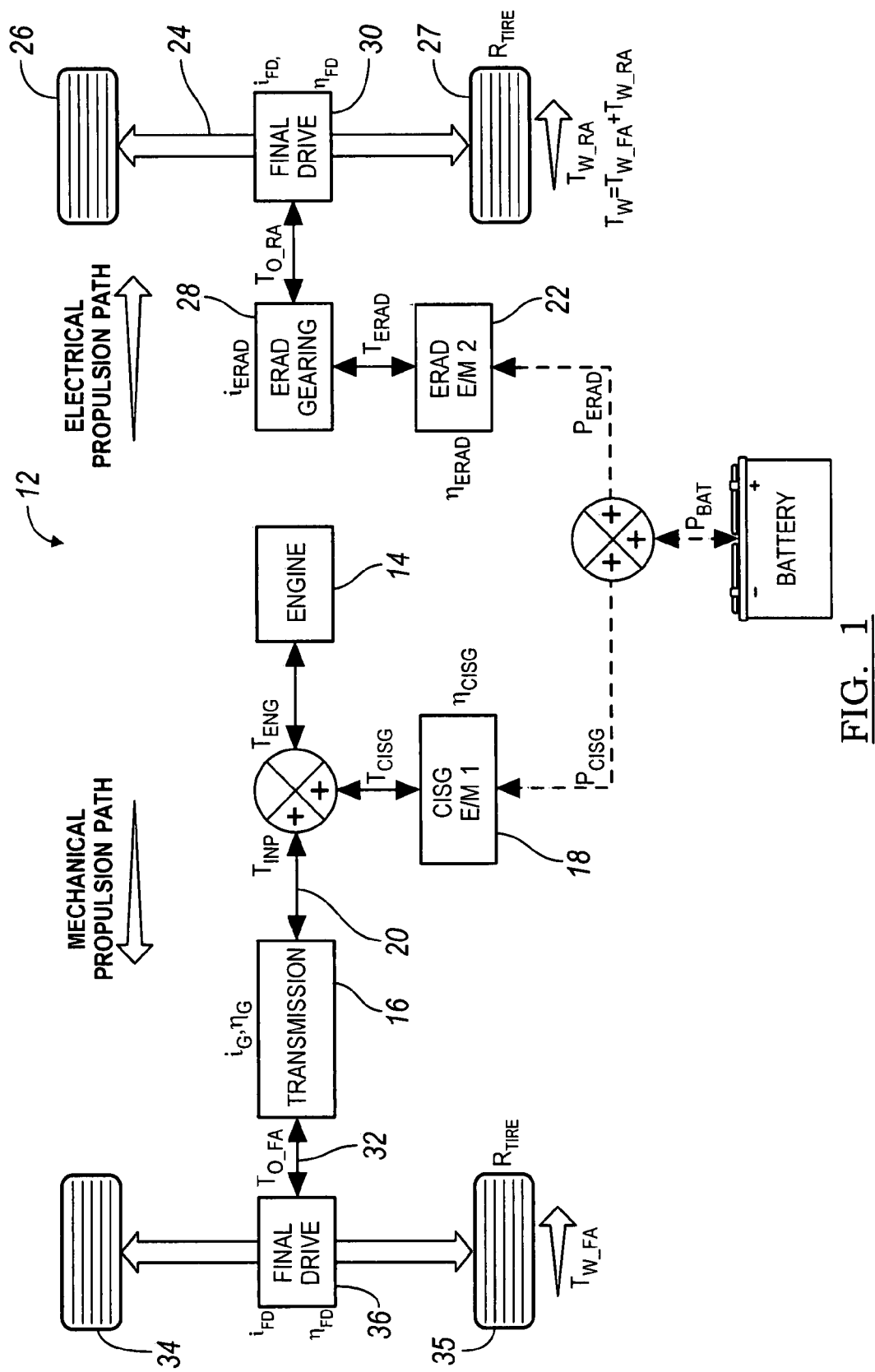
FIG. 1 is a schematic diagram of a vehicle powertrain system, to which the control can be applied.
Figure 2:
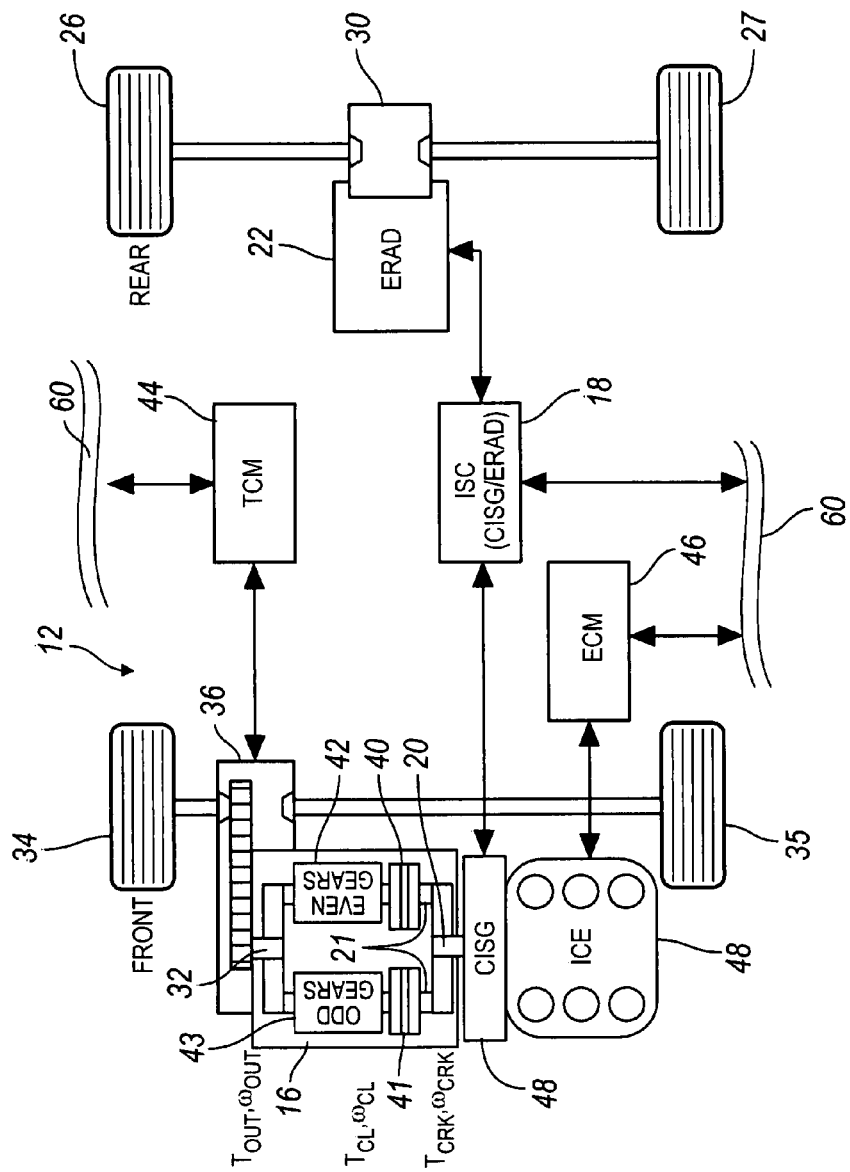
FIG. 2 is a schematic diagram showing additional details of the vehicle powertrain system of FIG. 1.

As shown in FIGS. 1 and 2, a vehicle powertrain 12 includes an engine 14, such as a diesel or gasoline engine; a transmission 16, such as dual wet clutch powershift transmission or another multiple ratio transmission having no torque converter; an electric machine 18, such as an ISG driveably connected to the transmission input 20; and an additional electric machine 22, such as an electric motor. Electric machine 18 provides starter/generator capability.

Electric machine 22, sometimes referred to as an electric rear axle drive unit (ERAD), is connected to the final drive of a rear axle 24 and provides additional propulsion capability in either an electric drive or hybrid (series/parallel) drive mode. In full FWD applications, electric machine 22 could also connected to the final drive of a front axle at the output of the transmission, and would be referred to as an electric front axle drive (EFAD) unit. Power output by the electric machine 22 drives vehicle wheels 26, 27 through ERAD gearing 28 and a final drive unit 30, which is in the form of an inter-wheel differential mechanism. Similarly, the transmission output 32 is driveably (mechanically) connected to vehicle wheels 34, 35 through a final drive unit 36, which includes an inter-wheel differential mechanism.

Powertrain 12 can operate in major modes including: (1) electric drive, in which ERAD 28 is operating as an electric motor or as an electric generator; (2) electric drive, in which engine 14 is running and producing combustion, CISG 18 is generating electric power, and ERAD 22 is alternately motoring and generating electric power; (2) Series Hybrid Drive, in which engine 14 is running and producing combustion and the ERAD 22 is motoring or generating electric power; (3) engine drive, in which engine 14 is running and ERAD 22 is shutdown; (4) parallel hybrid drive, in which engine 14 or ERAD 22 is running or both are running; (5) engine starting, in which CISG 18 is motoring to start the engine by driving the engine flywheel; and (6) engine stop, in which engine 14 is shut down. While operating in parallel hybrid drive mode, the powertrain can operate in several sub-modes including: (4.1) parallel hybrid drive 1, in which CISG 18 is shutdown, ERAD 22 is motoring or generating; and (4.2) parallel hybrid drive 2, in which CISG 18 is generating and ERAD 22 is alternatively shutdown, motoring or generating.

FIG. 2 illustrates the input clutches 40, 41, which selective connect the input shaft 20 of transmission 16 alternately to the even-numbered gears 42 and odd-numbered gears 43; an electronic transmission control module (TCM) 44, which controls the input clutches and gearbox state through command signals to servos that actuate the input clutches and gearbox shift forks/synchronizers; an electronic engine control module (ECM) 46, which controls operation of engine 14; an ISC 48, which controls the CISG and ERAD operations. A vehicle control system (VCS), which is not shown, issues control commands to the TCM and ECM. Each of the VCS, TCM 44 and ECM 46 includes a microprocessor accessible to electronic memory and containing control algorithms expressed in computer code, which are executed repeatedly at frequent intervals.

There are two propulsion paths, a mechanical path and an electrical path, which are used to meet the propulsion demand produced by the vehicle operator. The engine 14 can provide vehicle propulsion by transmitting torque through transmission 16 in the mechanical propulsion path to wheels 34, 35, and the ERAD machine 22 can provides vehicle propulsion directly in the electrical propulsion path to wheels 26, 27.

The vehicle launch control uses a torque-based control scheme to control the torque capacity of the transmission input clutches 40, 41 and engine crankshaft torque in response to an effective propulsion demand produced by the vehicle operator during a launch condition.

Figure 3:
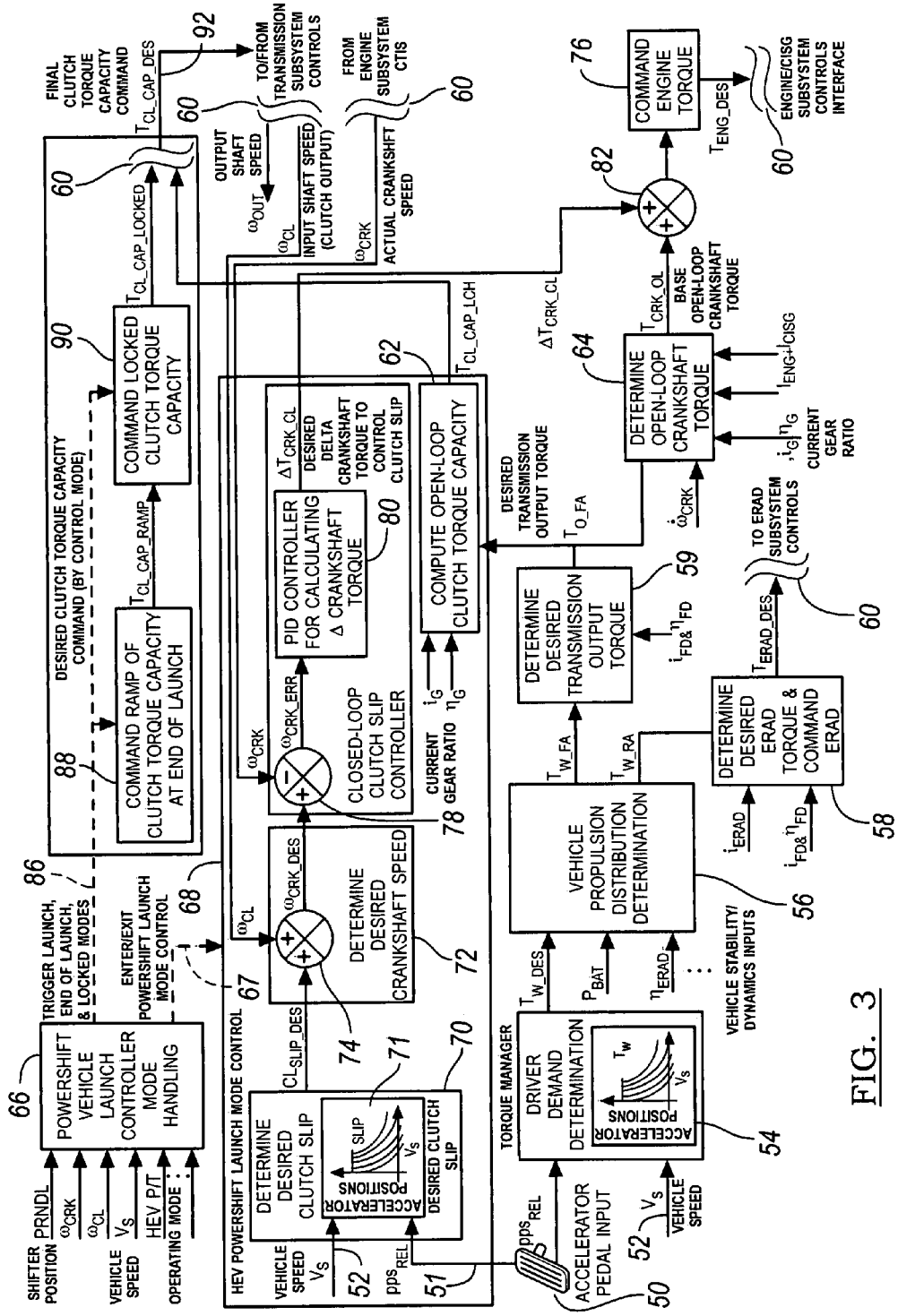
FIG. 3 is a schematic diagram of the vehicle launch control system.
Figure 4:
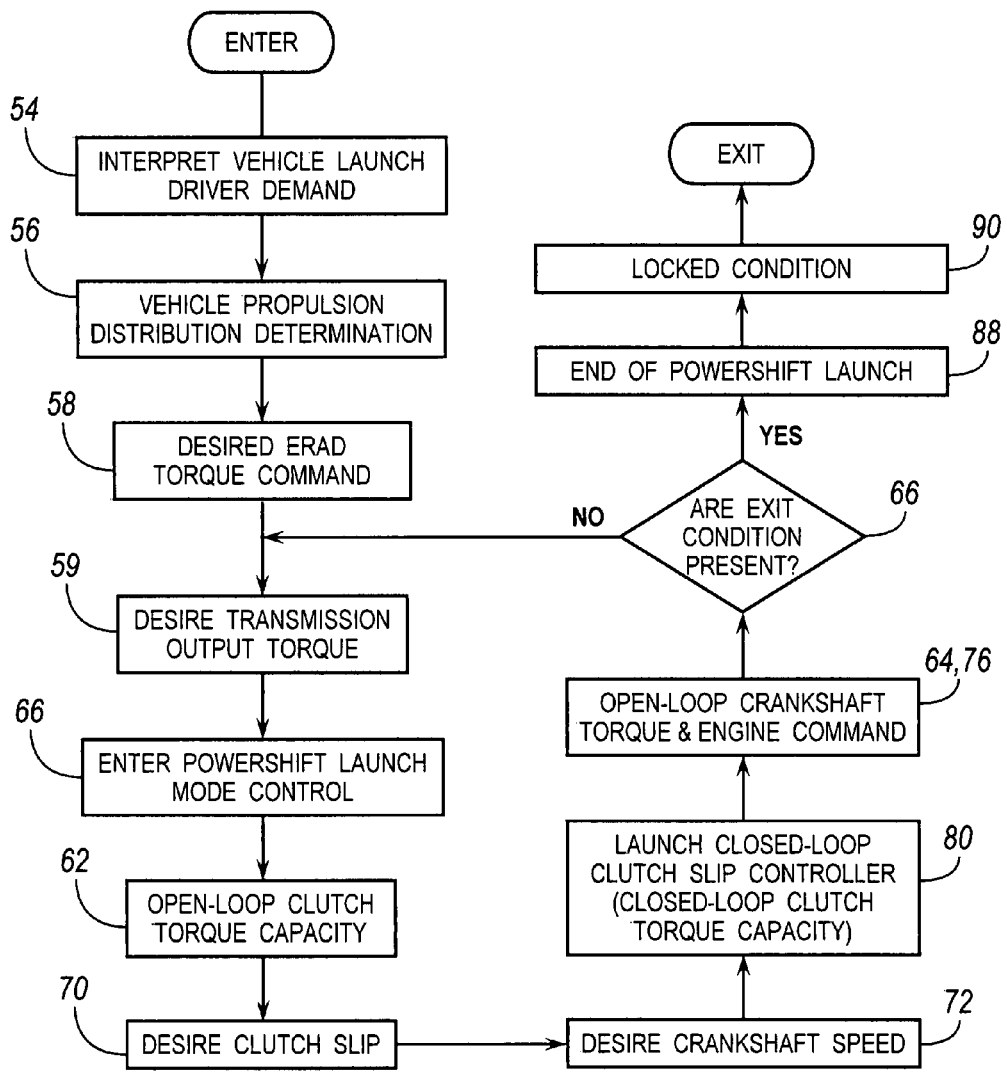
FIG. 4 is a diagram illustrating the vehicle launch control method steps.

The steps of an algorithm for controlling vehicle launch using the powertrain 12 illustrated of FIGS. 1 and 2 are shown in the control system diagram of FIG. 3 and the method steps diagram of FIG. 4. The vehicle operator's demand for wheel torque is represented by the degree to which the engine accelerator pedal 50 is depressed, which depression is usually referred to as accelerator pedal position, pps. An electronic signal 51 representing the accelerator pedal position produced by a pps sensor and an electronic signal representing the current vehicle speed 52 produced by a shaft speed sensor, are received as input by a driver demand determination function 54, which accesses in electronic memory a function indexed by the two input variables to produce the magnitude of the desired wheel torque $T_{W\_DES}$.

At 56, the desired front axle torque $T_{W\_FA}$ to be provided to front wheels 34, 35 by the mechanical propulsion path, which includes engine 14, transmission 16 and final drive 36, and the desired rear axle torque $T_{W\_RA}$ to be provided to rear wheels 26, 27 by the electrical propulsion path, which includes ERAD 22, ERAD gearing 28 and final drive 30, are determined upon reference to the desired wheel torque, such that the sum of the distributed propulsion torques equals the desired wheel torque $T_{W\_DES}$. The strategy for propulsion distribution may take into account vehicle stability and dynamics constraints, energy management and efficiency criteria, torque capabilities of the various power sources, etc.

At 58, the desired ERAD torque $T_{ERAD\_DES}$ is determined, upon reference to the ERAD gearing ratio, distributed propulsion 56 and the rear axle propulsion torque request $T_{W\_RA}$. At 58 a command representing desired ERAD torque $T_{ERAD\_DES}$ is sent on communication bus 60 to the ISC 18 control interface, which command causes the ERAD 22 to produce the desired ERAD torque $T_{ERAD\_DES}$ that corresponds to the desired rear axle torque $T_{W\_RA}$.

Similarly, at 59, the desired transmission output torque $T_{O\_FA}$ is determined from the distributed propulsion 56, the final drive ratio of the mechanical power path and the front axle propulsion torque request $T_{W\_FA}$. At 59 a command representing desired transmission output torque $T_{O\_FA}$ is sent to 62, where the torque capacity of the transmission input clutches 40, 41 is determined, and to 64, where engine crankshaft torque is determined. Details of the techniques employed at 62 and 64 are described below.

Control then passes to a powershift vehicle launch mode handling controller 66, which receives input signals representing the position of the transmission gear selector PRNDL, crankshaft speed $\omega_{CRK}$ of engine 14, vehicle speed VS 52, and the HEV powertrain operating mode. Controller 66 activates a vehicle launch mode controller 68, provided the desired transmission output torque $T_{O\_FA}$ is equal to or greater than a predetermined magnitude, and vehicle speed is low, thereby indicating that the vehicle is operating in vehicle launch mode and that the propulsion path that includes transmission 16 will be used during vehicle launch.

After controller 66 issues command 67, which activates the launch mode control 68, control passes to 62, where an open-loop control determines the desired input clutch torque capacity during vehicle launch $T_{CL\_CAP\_LCH}$, from the current transmission gear, its gear ratio, and the desired transmission output torque $T_{O\_FA}$. While the launch mode controller 68 is activated by controller 66, the desired clutch torque capacity during vehicle launch $T_{CL\_CAP\_LCH}$ is sent to TCM 44 on communication bus 60 as the final input clutch torque capacity command 92 $T_{CL\_CAP\_DES}$.

At 70, the vehicle launch controller 68 determines the desired slip across the subject input clutch 40, 41 $CL_{SLIP\_DES}$ from a function 71 stored in electronic memory and indexed by the current vehicle speed VS 52 and accelerator pedal position 51. The subject input clutch 40, 41 is the clutch associated with the gear in which the transmission is operating during vehicle launch.

At 72, the desired engine crankshaft speed $\omega_{CRK\_DES}$ at the transmission input 20 is determined at summing junction 74 from the desired clutch slip $CL_{SLIP\_DES}$ and current clutch output speed, i.e., $\omega_{CL}$ at the gearbox input 21. A signal representing the current clutch output speed $\omega_{CL}$ is carried on communication bus 60 from the TCM 44 to summing junction 74. The desired engine crankshaft speed $\omega_{CRK\_DES}$ and current engine crankshaft speed $\omega_{CRK}$ are supplied as inputs to summing junction 78.

Control then passes to 64, where torque $T_{CRK\_OL}$ carried by the engine crankshaft and transmission input 20 is determined open-loop upon reference to the desired transmission output torque $T_{O\_FA}$, current transmission gear, the current gear ratio, and expected inertial losses associated with crankshaft acceleration during vehicle launch.

At summing junction 78, the magnitude of engine crankshaft speed error $\omega_{CRK\_ERR}$, i.e., the difference between the desired engine crankshaft speed $\omega_{CRK\_DES}$ at the transmission input 20 and the current crankshaft speed $\omega_{CRK}$, is determined and supplied as input to a PID controller 80 or a similar closed loop controller. A signal representing the current crankshaft speed $\omega_{CRK}$ is carried on communication bus 60 from the ECM 46 to summing junction 78. In order to control slip across the subject input clutch 40, 41 during vehicle launch, controller 80 determines a desired change or delta crankshaft torque $\Delta T_{CRK\_CL}$ that minimizes the engine crankshaft speed error $\omega_{CRK\_ERR}$.

The desired delta crankshaft torque $\Delta T_{CRK\_CL}$ is sent to summing junction 82, where it is added to the magnitude of torque $T_{CRK\_OL}$ carried by the engine crankshaft and transmission input 20. The sum produced at summing junction 82 is supplied as input to 76, where the controller issues a command $T_{ENG\_DES}$ carried on communication bus 60 to ECM 46, which responds to the command by adjusting engine torque to produce the desired crankshaft torque $T_{ENG\_DES}$.

Control then returns to 66 to determine whether the powershift vehicle launch mode control 68 should be deactivated based on the current conditions. If the current clutch slip $CL_{SLIP}$ is minimal, crankshaft speed $\omega_{CRK}$ is above the clutch output speed $\omega_{CL}$, and vehicle speed VS is above a threshold vehicle speed, then the vehicle launch mode control 68 is exited upon controller 66 issuing command signals 67 and 86.

After the subject input clutch 40, 41 is smoothly engaged with zero clutch slip at 88, controller 66 activates a locked mode at 90 and a command $T_{CL\_CAP\_LOCKED}$ is produced and carried on the communication bus 60 to the TCM 44 as the final input clutch torque capacity command 92 $T_{CL\_CAP\_DES}$. After the subject input clutch 40, 41 is fully engaged, the command $T_{CL\_CAP\_LOCKED}$ issued by 90 causes the subject input clutch to become fully engaged or locked at a clutch torque capacity well above the current crankshaft torque magnitude, thereby ensuring that the transmission will not slip.

If any of the conditions required to exit the control vehicle launch control is absent, control returns to 59, where the subsequent steps of the control strategy are repeated.

FIG. 4 lists the steps of the vehicle launch control and uses the same reference numbers as are used in the sequence of steps described with reference to FIG. 3.

The graphs of FIG. 5A-5F show the variation with time of variables and parameters of the powertrain that are used or produced by executing the control algorithm. For example, FIG. 5A relates to wheel torques. At 100, the vehicle operator tips into the accelerator pedal during the neutral mode when neither input clutch 40, 41 is engaged, thereby initiating a vehicle launch condition, which begins at 102. Desired wheel torque 104 $T_{W\_DES}$ and desired front axle torque 106 $T_{W\_FA}$ differ in magnitude by the magnitude of the desired rear axle torque 108 $T_{W\_RA}$. At 110, rear axle torque is blended out leaving only front axle torque to drive the vehicle during the vehicle launch mode.

Figure 5A:
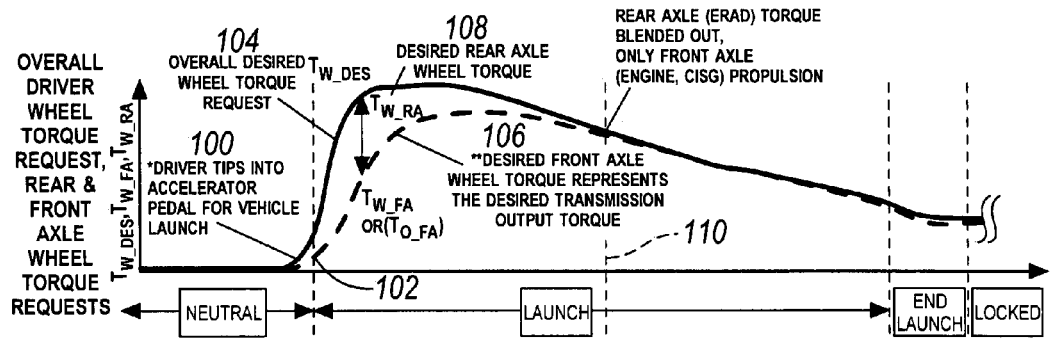
FIG. 5A is a graph showing the variation with time of desired wheel torques during vehicle launch operation produced by executing the control algorithm.
Figure 5B:
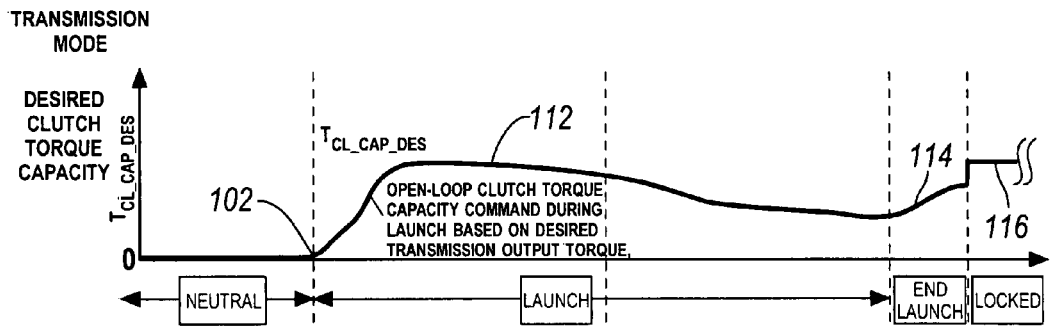
FIG. 5B is a graph showing the variation of the desired torque capacity of the subject input clutch with time during vehicle launch operation.

FIG. 5B shows the variation of the desired torque capacity of the subject input clutch. At 102, the open-loop clutch torque capacity 112 $TCL_{CAP\_DES}$ is commanded during the vehicle launch mode based on desired transmission output torque $T_{O\_FA}$. At the end of the launch mode, the clutch torque capacity is ramped at 114 to smoothly engage the transmission. Once the clutch is engaged at the end of the launch mode, the torque capacity of the subject input clutch is stepped up and held at 116 to fully lock the clutch and ensure the input clutch does not slip.

Figure 5C:
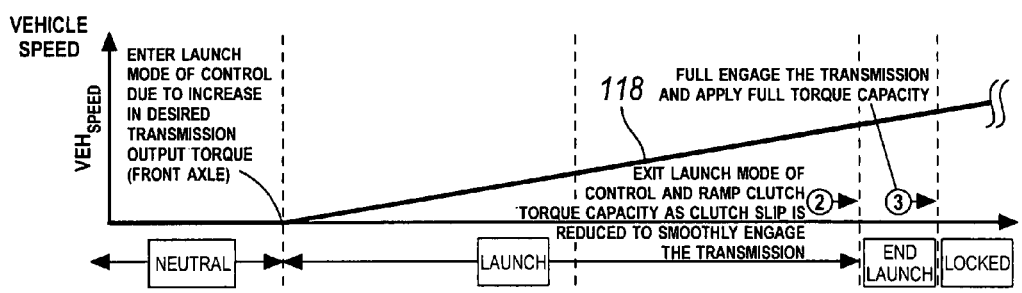
FIG. 5C is a graph showing the variation of vehicle speed with time during vehicle launch operation.

Vehicle speed 118, represented in FIG. 5C, is zero in the neutral mode, and increases throughout the launch mode.

Figure 5D:
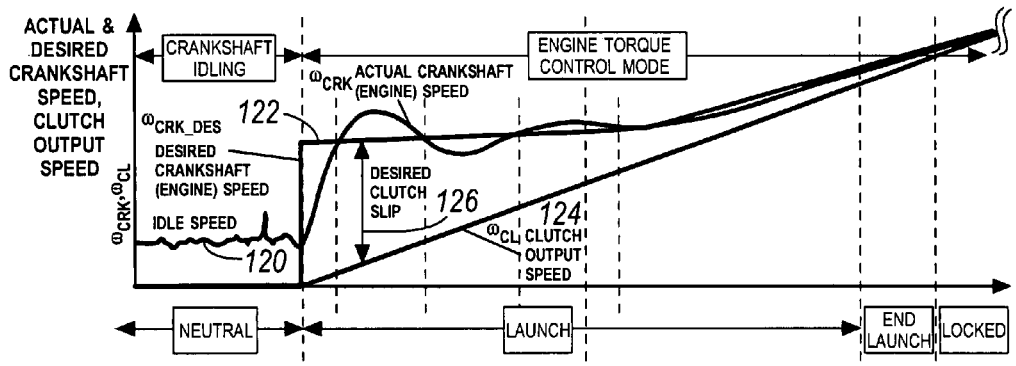
FIG. 5D is a graph showing the variation of engine crankshaft speed, desired engine crankshaft speed, and clutch output speed with time of wheel torques during vehicle launch operation.

The variation of actual engine crankshaft speed 120, desired engine crankshaft speed 122, and clutch output speed 124 are represented in FIG. 5D. The desired slip across the subject input clutch is represented by the difference 126 between desired crankshaft speed 122 and clutch output speed 124. The control causes actual clutch slip to approach the desired clutch slip as actual crankshaft speed 120 is controlled to the desired crankshaft speed 122. When the desired and actual crankshaft speeds are equal, the desired clutch slip is met, but the clutch may be slipping. The locations where actual crankshaft speed passes through desired crankshaft speed are shown by dashed vertical lines as shown in FIGS. 5D & 5E.

Figure 5E:
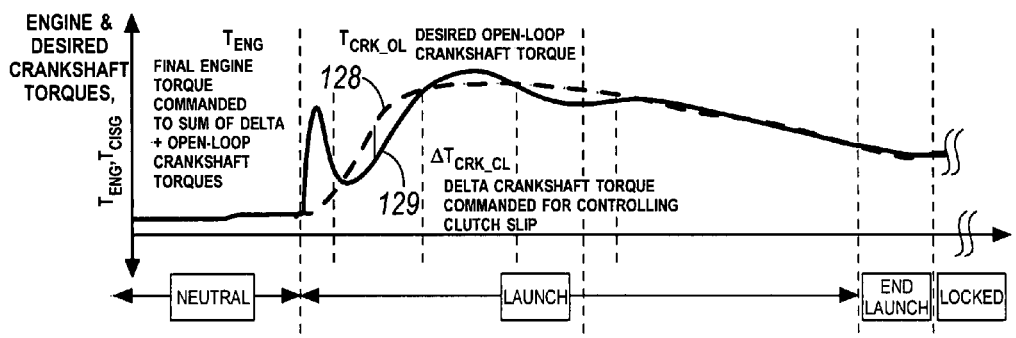
FIG. 5E is a graph showing the variation of engine torque and desired crankshaft torque with time during the vehicle launch operating mode.

FIG. 5E illustrates the variation of engine torque, which at 64 is controlled to a desired open-loop crankshaft torque 128, and desired delta crankshaft torque 129 $\Delta T_{CRK\_CL}$, whose magnitude is determined at 80.

Figure 5F:
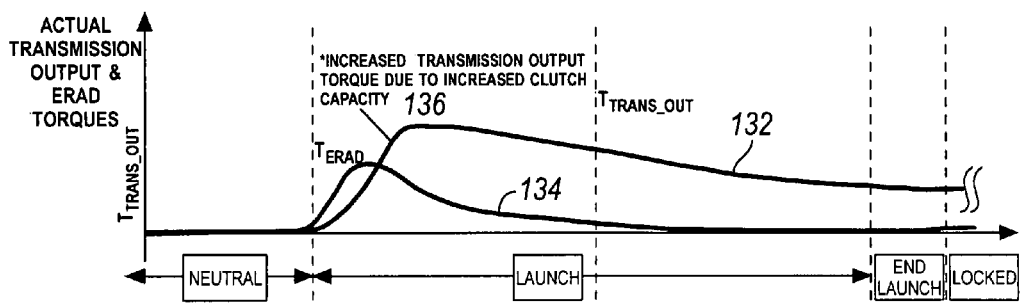
FIG. 5F is a graph showing the variation of transmission output torque and ERAD torque with time during vehicle launch operation.

FIG. 5F illustrates the variation of transmission output torque 132 $T_{TRANS\_OUT}$ and ERAD torque 134 $T_{ERAD}$. The increase 136 in transmission output torque is due to increased clutch torque capacity 112, shown in FIG. 5B.

The effective propulsion request for the transmission propulsion path is the desired transmission output torque during a vehicle launch condition after propulsion distribution between both the mechanical and electrical paths has been determined. This approach compensates for any vehicle propulsion assistance provided by the ERAD during a vehicle launch condition since the overall vehicle propulsion request can be met by both the mechanical propulsion path and electrical propulsion path.

Figure 6:
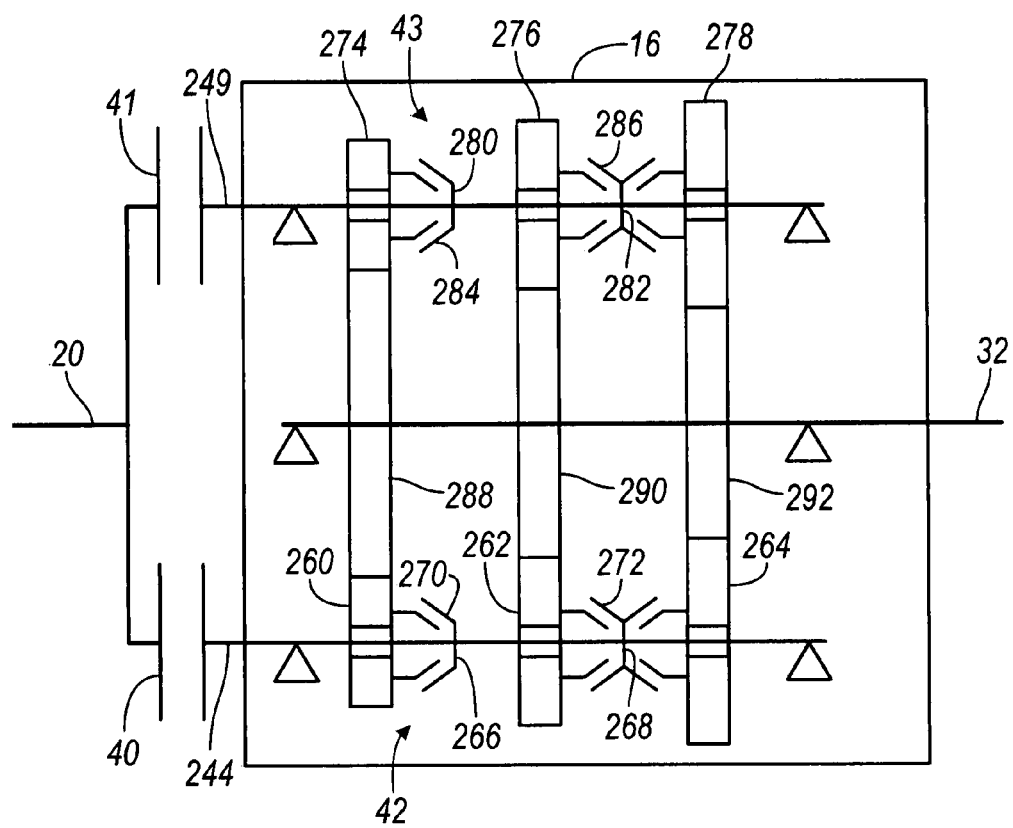
FIG. 6 is a schematic diagram showing details of a powershift transmission.

FIG. 6 illustrates details of a powershift transmission 16 including a first input clutch 40, which selective connects the input 20 of transmission 16 alternately to the even-numbered gears 42 associated with a first layshaft 244, and a second input clutch 41, which selective connects the input 20 alternately to the odd-numbered gears 43 associated with a second layshaft 249.

Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 32 supports gears 288, 290, 292, which are each secured to shaft 32. Gear 288 meshes with pinions 260 and 274. Gear 290 meshes with pinions 262 and 276. Gear 292 meshes with pinions 264 and 278.

Couplers 266, 268, 280 and 282 may be synchronizers, or dog clutches or a combination of these. Although operation of the transmission 16 is described with reference to forward drive only, the transmission can produce reverse drive by incorporating a reverse idler gear in one of the lower power paths and a reverse coupler for engaging reverse drive. One of the input clutches 40, 41 would be engaged when reverse drive operation is selected.

Although the invention has been described with reference to a powershift transmission, the invention is applicable to any conventional manual transmission, automatic shift manual transmission, or automatic transmission that has no torque converter located in a power path between the engine and transmission input.

In accordance with the provisions of the patent statutes, the preferred embodiment has been described. However, it should be noted that the alternate embodiments can be practiced otherwise than as specifically illustrated and described.

What is claimed is:

1. A method for controlling the launch of a vehicle having a powertrain that includes a first power path for driving a first wheel set and including an engine, a transmission having an input driveably connected to a crankshaft of the engine, a current gear, an input clutch associated with the current gear and an output connected to first wheel set, and a second power path including an electric machine for driving a second wheel set, comprising the steps of:
    (a) determining a desired magnitude of wheel torque to be produced at the first wheel set;
    (b) using the desired magnitude of wheel torque to be produced at the first wheel set to determine a magnitude of crankshaft torque;
    (c) producing a predetermined magnitude of torque capacity at the input clutch;
    (d) determining a crankshaft speed error;
    (e) determining a change in magnitude of torque at the crankshaft that will reduce the crankshaft speed error; and
    (f) operating the engine to produce a desired engine torque, whose magnitude is determined from the change in magnitude of torque at the crankshaft and the magnitude of desired crankshaft torque.

2. The method of claim 1 further comprising the step of using a speed of the vehicle and a position of an accelerator pedal to determine a vehicle propulsion request demand.

3. The method of claim 1, further comprising the steps of:
    increasing the torque capacity of the input clutch along a ramp to a torque capacity that is equal to the torque at crankshaft; and
    further increasing the torque capacity of the input clutch to a torque capacity greater than the torque at the crankshaft.

4. The method of claim 1, further comprising the steps of:
    determining a desired magnitude of wheel torque to be produced at the second wheel set; and
    operating the electric machine to produce the desired magnitude of torque at the second wheel set.

5. The method of claim 1, wherein step (c) further comprises the step of using the desired magnitude of wheel torque to be produced at the first wheel set and a gear ratio of the current gear to determine the magnitude of torque capacity of the input clutch.

6. The method of claim 1, wherein step (d) further comprises the steps of:
    determining a desired slip across the input clutch;
    using the desired slip across the input clutch and speed of the output of the input clutch to determine desired crankshaft speed; and
    using a difference between the desired crankshaft speed and a speed of the crankshaft to determine the crankshaft speed error.

7. The method of claim 6 further comprising the step of using a current vehicle speed and an accelerator pedal position to determine the desired slip across the input clutch.

8. The method of claim 6 further comprising the step of using the desired input clutch slip and a speed of an output of the input clutch to determine the desired crankshaft speed.

9. The method of claim 1 wherein step (e) further comprises the step of using a controller and the crankshaft speed error to determine the desired change in torque at the crankshaft that will reduce the crankshaft speed error.

10. The method of claim 1 further comprising the steps of:
    (A) determining whether a slip across the input clutch is substantially zero;
    (B) determining whether a speed of the engine is greater than a speed of the output of the input clutch;
    (C) determining whether a speed of the vehicle is greater than a predetermined vehicle speed; and
    discontinuing performance of the method if conditions (A), (B) and (C) are present.

11. The method of claim 1 wherein step (d) further comprises the steps of:
    using a vehicle speed and a position of an accelerator pedal to determine a desired input clutch slip;
    using a current speed of the input clutch and the desired input clutch slip to determine a desired speed of the crankshaft;
    using the current speed of the crankshaft and the desired speed of the crankshaft to determine the crankshaft speed error.

12. A method for controlling the launch of a vehicle having a powertrain that includes a first power path for driving a first wheel set and including an engine, a transmission having an input driveably connected to a crankshaft of the engine, a current gear, an input clutch associated with the current gear and an output connected to first wheel set, and a second power path including an electric machine for driving a second wheel set, comprising the steps of:

(A) using an operator demand for a desired wheel torque to determine a desired wheel torque at the first wheel set and a desired wheel torque at the second wheel set;

(B) using the desired magnitude of wheel torque to be produced at the first wheel set to determine a magnitude of desired crankshaft torque;

(C) producing a predetermined magnitude of torque capacity of the input clutch;

(D) determining a crankshaft speed error;

(E) determining a change in magnitude of torque at the crankshaft that will reduce the crankshaft speed error;

(F) operating the engine to produce a desired engine torque, whose magnitude is determined from the change in magnitude of torque at the crankshaft and the magnitude of desired crankshaft torque; and (G) operating the electric machine to produce the desired magnitude of torque at the second wheel set.

13. The method of claim 12, further comprises the steps of:
increasing the torque capacity of the input clutch along a ramp to a torque capacity that is equal to the torque at the crankshaft; and
further increasing the torque capacity of the input clutch to a torque capacity greater than the torque at the crankshaft.

14. The method of claim 12, wherein step (C) further comprises the step of using the desired wheel torque at the first wheel set and a gear ratio of the current gear to determine the magnitude of torque capacity of the input clutch.

15. The method of claim 12, wherein step (D) further comprises the steps of:
determining a desired slip across the input clutch;
using the desired slip across the input clutch and a speed of an output of the input clutch to determine a desired crankshaft speed; and
using a difference between the desired crankshaft speed and a speed of the crankshaft to determine the crankshaft speed error.

16. The method of claim 15 further comprising the step of using a current vehicle speed and an accelerator pedal position to determine the desired slip across the input clutch.

17. The method of claim 15 further comprising the step of using the desired input clutch slip and a speed of an output of the input clutch to determine the desired crankshaft speed.

18. The method of claim 12 wherein step (E) further comprises the steps of using a controller and the crankshaft speed error to determine the desired change in torque at the transmission input that will reduce the crankshaft speed error.

19. The method of claim 12 wherein step (D) further comprises the steps of:
using a vehicle speed and a position of an accelerator pedal to determine a desired input clutch slip;
using a current speed of the input clutch and the desired input clutch slip to determine a desired speed of the crankshaft;
using the current speed of the crankshaft and the desired speed of the crankshaft to determine the crankshaft speed error.

20. A system for controlling a vehicle launch condition comprising:
the first wheel set driveably connected to an engine that includes a crankshaft;
a transmission including an input driveably connected to the crankshaft and an output, the transmission being able to operate in a current gear;
an input clutch for alternately closing and opening a drive connection between the crankshaft and transmission input; and
an electric machine driveably connected to the second wheel set;
a controller configured to determine a desired magnitude of wheel torque to be produced at the first wheel set and the second wheel set, determine a magnitude of crankshaft torque, produce a predetermined magnitude of torque capacity of the input clutch, determine a crankshaft speed error, determine a change in magnitude of torque at the crankshaft that will reduce the crankshaft speed error, operate the engine to produce a desired engine torque, whose magnitude is determined from the change in magnitude of torque at the crankshaft and the magnitude of desired crankshaft torque, and operating the electric machine to produce the desired magnitude of torque at the second wheel set.

21. The system of claim 20 further including a second wheel set, and wherein the controller is configured further to determine a desired magnitude of wheel torque to be produced at the second wheel set, and operating the electric machine to produce the desired magnitude of torque at the second wheel set.

22. The system of claim 20, wherein the controller is further configured to:
increase the torque capacity of the input clutch along a ramp to a torque capacity that is equal to the torque at the crankshaft; and
further increase the torque capacity of the input clutch to a torque capacity greater than the torque at the crankshaft.

23. The system of claim 20, wherein the controller is further configured to use the desired magnitude of wheel torque to be produced at the first wheel set and a gear ratio of the current gear to determine the magnitude of torque capacity of the input clutch.

24. The system of claim 20, wherein the controller is further configured to:
determine a desired slip across the input clutch;
use the desired slip across the input clutch and speed of the an output of the input clutch to determine desired crankshaft speed; and
use a difference between the desired crankshaft speed and a speed of the crankshaft to determine the crankshaft speed error.

25. The system of claim 20 wherein the controller is further configured to use the crankshaft speed error to determine the desired change in torque at the crankshaft that will reduce the crankshaft speed error.

* * * * *